Figure 4:
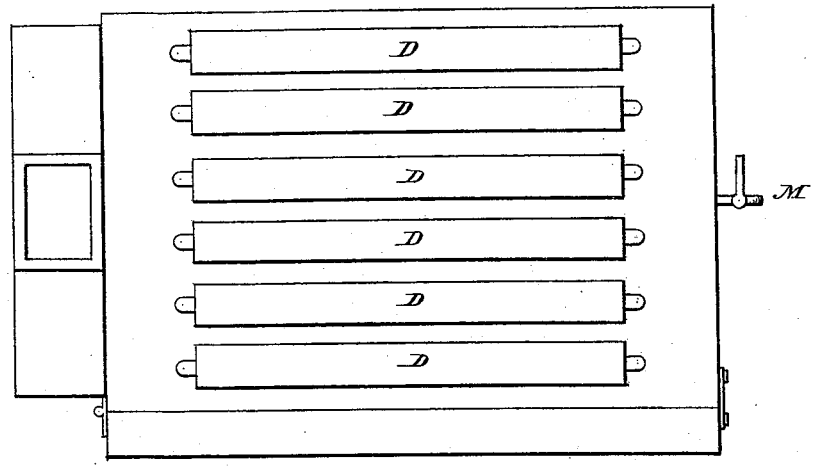

(Model.)
G. W. DEITZLER.
COMBINED WATER COOLER AND REFRIGERATOR.
No. 247,020. Patented Sept. 13, 1881.
2 Sheets—Sheet 1.
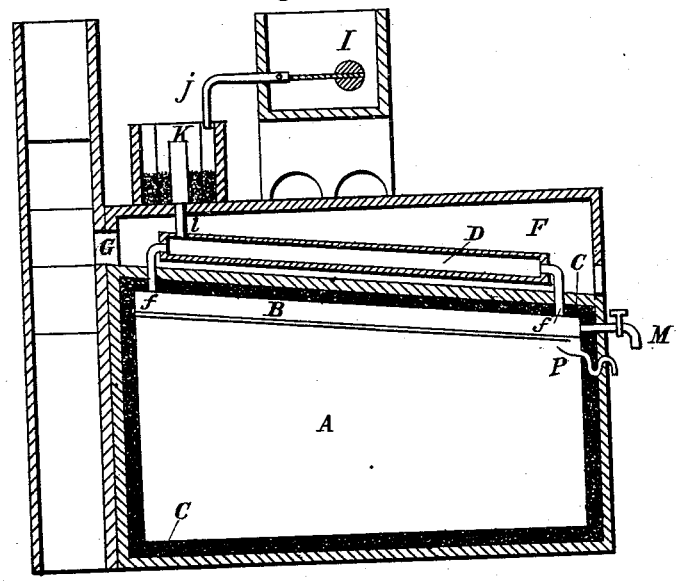
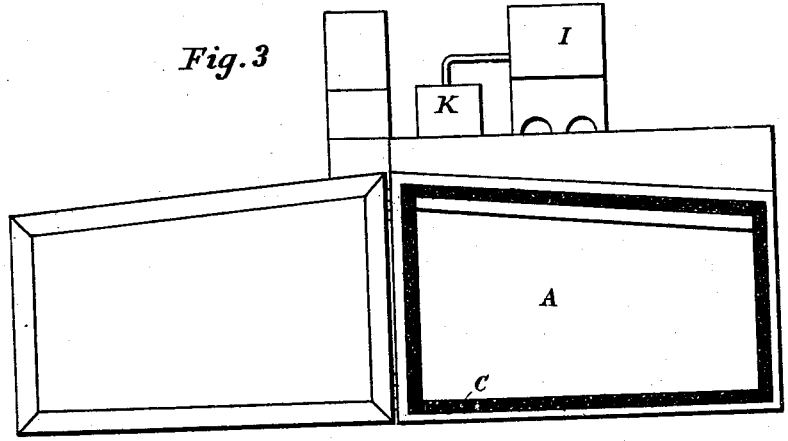
Witnesses
Wm Floyd Duckett
D. B. Lawler
Inventor
George W. Deitzler
per Jno. L. Boone
Attorney (Model.) 2 Sheets—Sheet 2.
G. W. DEITZLER.
COMBINED WATER COOLER AND REFRIGERATOR.

No. 247,020. Patented Sept. 13, 1881.

Attest:
Wm Floyd Duckett
D. B. Lawley

Inventor:
George W. Deitzler
per Jno. L. Boone
Atty.

UNITED STATES PATENT OFFICE.

GEORGE W. DEITZLER, OF SAN FRANCISCO, CALIFORNIA.

COMBINED WATER-COOLER AND REFRIGERATOR.

SPECIFICATION forming part of Letters Patent No. 247,020, dated September 13, 1881.

Application filed April 22, 1881. (Model.)

*To all whom it may concern:*

Be it known that I, GEORGE W. DEITZLER, of the city and county of San Francisco, and State of California, have invented a Combined Water-Cooler and Refrigerator; and I do hereby declare that the following is a full, clear, and exact description thereof, reference being had to the drawings accompanying this specification and forming a part of the same.

My invention has reference to an apparatus for cooling water by the evaporation of the moisture on the exterior walls or surfaces of porous vessels in which the water is contained, and combining said vessels with pipes or compartments in a chamber or room in such a manner that a natural circulation of cold water is established and maintained in, through, and around said vessels, pipes, and compartments, by which means the temperature of the air in the interior of the chamber or room is sufficiently reduced to preserve animal and vegetable substances without the use of ice or other cold-producing operation or process.

Figure 1, Sheet 1, shows a longitudinal section. Fig. 2, Sheet 1, shows a detail. Fig. 3, Sheet 1, shows a cross-section; Fig. 4, Sheet 2, a plan view of a series of pipes or vessels.

I do not confine myself to any particular form, size, or position of said evaporating-vessels, pipes, compartment, chamber, or room.

In the present instance I have represented the evaporating-vessels as being a series of porous tubes, D D, which can be made of terra-cotta, canvas, or any other substance or material through which water will percolate. These tubes or evaporating-vessels I place nearly horizontally on the top of the box or chamber A, and connect them at both ends with the compartment or cold-water place B by means of pipes *f*, so that the water contained in them can circulate freely through said tubes, pipes, and cold-water space or compartment, which cold-water space may be made so as to entirely surround the room or chamber A.

I construct a housing or case, F, over the evaporating-vessels, with an opening, G, at one end, and connect the opposite end with a chimney or other device, by which means a rapid current of air will be caused to pass over and around said porous vessels. In this way the evaporation is increased, and as a consequence the temperature of the water may be reduced to a very low temperature.

Upon the housing F, I place a self-acting water-supply tank, I, from which a pipe, *j*, leads the water to the filter K, and a pipe, *l*, leads it from the filter to the evaporating-vessels D. By this arrangement the water is supplied automatically and as fast as it disappears from the evaporating-vessels, and, being filtered and purified, is better fitted for drinking and domestic purposes, and also prevents the pores of the vessels from being filled or clogged by the sediment which is suspended in unfiltered water.

A faucet or cock, M, is provided for drawing water from the compartment B, and gutters S S, Fig. 2, Sheet 1, are arranged to convey any accumulation of moisture which may be deposited by condensation against the metallic lining of the bottom of the compartment B to the drip-pipe P.

It will be noticed that my evaporating-vessels are entirely outside of the chamber or room to be cooled, and separated from the cold-water compartment by a wall or partition holding a good non-conductor, except where they are connected by the pipes *f*.

The evaporating-vessels D D, Fig. 1, Sheet 1, and the cold-water compartment are placed at a suitable inclination to insure a natural and continuous circulation of the water therein.

It will now be understood that if the vessels D D are filled with water it will percolate through their porous walls and appear on their exterior surfaces, whence the moisture will be rapidly evaporated and carried away by the current of air which is caused by the draft up the chimney or otherwise. As the water in the vessels D D becomes cool it descends into the compartment B, and is replaced by the warmer water, thus creating a regular flow or circulation.

Let A, Fig. 1, Sheet 1, represent a chamber or room which it is desired to convert into a refrigerator for preserving animal and vegetable substances. I line the inside of this chamber on all sides with zinc or other non-corrosive substance. The top or ceiling of this chamber (which is the bottom of the cold-water compartment B) I make of metal having great emissive power, preferably of copper, and I corrugate it deeply, so as to give a larger surface. The cold-water space or compartment B extends entirely over the chamber or room A, and between this cold-water compartment and the vessels D D, I place a wall or partition of felt, C, or other non-conducting substance or material; and I also cover the outside of the zinc lining on all sides, except the top of the chamber A, with such felt or other non-conductor, and inclose the entire chamber with wood, making it as nearly air-tight as possible, leaving a door for introducing and removing the articles to be preserved.

In some instances I place the porous tubes D on the roof of a house, upon a good non-conductor, and the cold-water space or chamber B and refrigerator H in the kitchen or other room below, connecting said tubes and the cold-water space by means of the pipes $f$. In this arrangement the housing F is made removable, so that the porous tubes or evaporative surfaces may be conveniently exposed at night to the external air by simply removing the housing or covering, thus securing the benefit of radiation. The air which is caused to pass over the porous tubes D will have its temperature greatly reduced, and may be caused to flow with great advantage into and through a dairy or other room by interposing such room between the housing F and the chimney G'. The connection between the housing F and the room or compartment to be cooled and ventilated is made by means of suitable ingress-ducts, and the air should be discharged into the room near the floor; and the connection between the room and the chimney G' is made by means of egress-ducts placed near the ceiling of the room.

Having thus described my invention, what I claim, and desire to secure by Letters Patent, is—

1. The combination of the porous pipes or vessels D, connected with a water-supply pipe, with a water-space and a chamber inclosing said porous pipes or vessels, said chamber being provided with openings for the passage of the air, as set forth.

2. The porous pipe or pipes D, provided with a water-supply pipe, in combination with a water space or pipe connected therewith and with a chamber or space, A, as and for the purposes set forth.

3. The combination, with the porous pipes or vessels, of the water-supply pipe, of a filter for said supply, and of an inclosing-chamber with openings for the passage of air, as set forth.

4. The combination of a water-cooling device composed of a porous pipe or vessel, D, inclosed in a chamber or jacket, F, provided with openings for the passage of air, with a chamber or space, A, having one or more of its walls in contact with the water cooled by the porous vessel or vessels D, as set forth.

5. A cooling and refrigerating apparatus consisting of porous vessels inclosed in a case having openings for the passage of the air and means for producing a draft over the surface of said porous vessels, substantially as set forth.

6. As a method of cooling and ventilating a room, the interposition of such room between the evaporative surfaces D, covered by the housing F, and the chimney G', or other draft-producing device, substantially as set forth.

7. In a cooling and refrigerating apparatus, the combination of porous pipes or vessels, a water-space, and a pipe or pipes, $f$, for conveying the water cooled by evaporation within such porous vessels to the said water-space.

In witness whereof I have hereunto attached my hand and seal.

GEO. W. DEITZLER. [L. S.]

Witnesses:
WM. FLOYD DUCKETT,
D. B. LAWLER.